United States Patent [19]

Tetzlaff et al.

[11] Patent Number: 5,104,497
[45] Date of Patent: Apr. 14, 1992

[54] ELECTROCHEMICAL PROCESS FOR TREATING LIQUID ELECTROLYTES

[76] Inventors: Karl-Heinz Tetzlaff; Dieter Schmid; Jürgen Russow, all of c/o Hoechst Aktiengesellschaft, P.O. Box 80 03 20, D-6230 Frankfurt am Main 80, Fed. Rep. of Germany

[21] Appl. No.: 634,788

[22] Filed: Dec. 27, 1990

Related U.S. Application Data

[63] Continuation of Ser. No. 191,255, May 6, 1988, abandoned, which is a continuation of Ser. No. 692,300, Jan. 17, 1985, abandoned.

[30] Foreign Application Priority Data

Jan. 19, 1984 [DE] Fed. Rep. of Germany ....... 3401636

[51] Int. Cl.$^5$ .............................................. C25B 1/00
[52] U.S. Cl. .................................. 204/59 R; 204/98; 204/128; 204/129; 204/72; 204/180.1; 429/14; 429/51
[58] Field of Search ............... 204/72, 98, 128, 129, 204/180 P, 283, 284, 263-266, 275-278, 59 R; 429/14, 51

[56] References Cited

U.S. PATENT DOCUMENTS

| | | | |
|---|---|---|---|
| 3,969,201 | 7/1976 | Qleman et al. | 204/84 |
| 4,118,305 | 10/1978 | Qleman et al. | 204/83 |
| 4,305,793 | 12/1981 | Broniewski | 204/98 |
| 4,430,176 | 2/1984 | Davison | 204/284 |

Primary Examiner—John F. Niebling
Assistant Examiner—Kathryn Gorgos

[57] ABSTRACT

A process for the manipulation of liquid electrolyte and gas during the operation of an electrochemical cell having at least one gas diffusion electrode and a counter electrode forming an electrolyte space for a flowing electrolyte which flows through the cell, from the upper end of the cell to its lower end, which electrolyte space is nonpartitioned or is partitioned by a separator, the gas diffusion electrode having a surface facing toward the electrolyte space and an opposite surface facing opposite from the electrolyte space, and the cell having a gas space located on the opposite surface, the process comprising:

feeding gas to or discharging gas from the gas space,
feeding electrolyte to the electrolyte space and permitting the electrolyte to flow through the space from its upper end to its lower end by gravity only, the hydrostatic pressure between the upper end of the electrolyte space and the lower end of the electrolyte space being compensated for by decreasing the hydrodynamic pressure to provide a constant pressure at all locations along the length of the electrolyte space, from the lower end to the upper end.

15 Claims, 5 Drawing Sheets

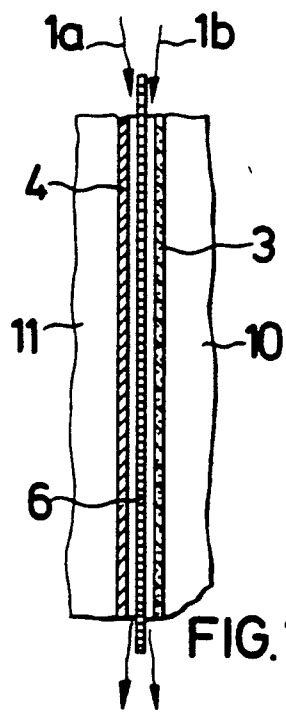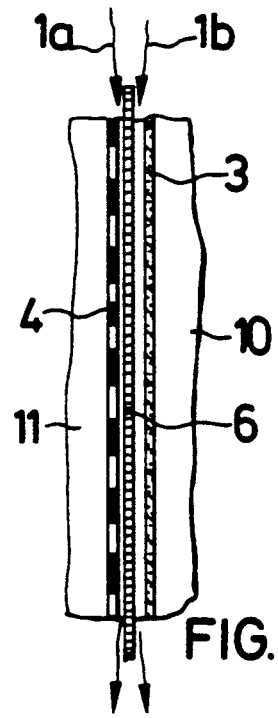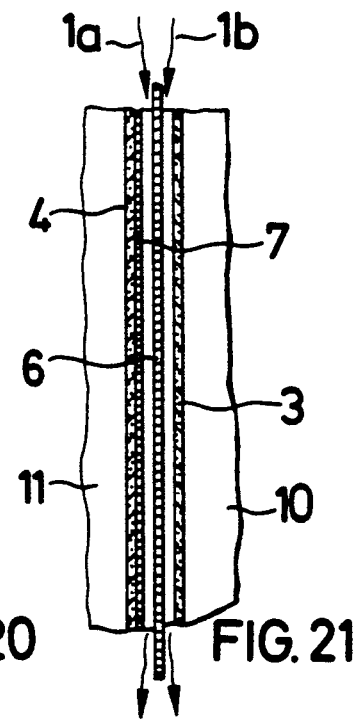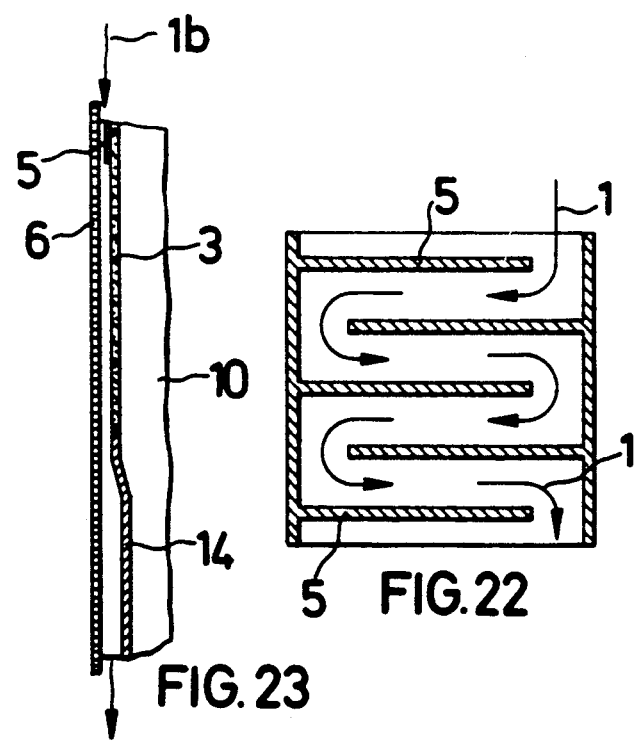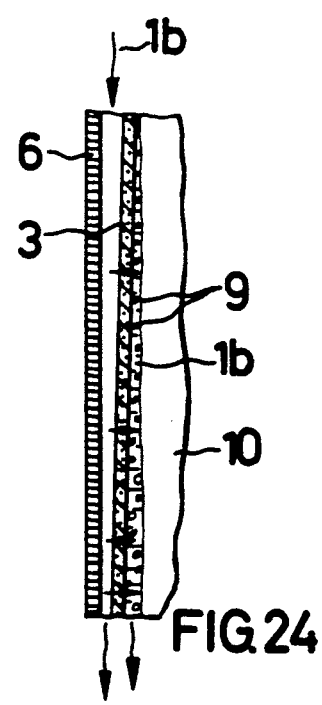

ELECTROCHEMICAL PROCESS FOR TREATING LIQUID ELECTROLYTES

CROSS REFERENCE TO RELATED APPLICATION

This application is a continuation of application Ser. No. 191,255, filed May 6, 1988, abd which is a continuation of Ser. No. 692,300 filed Jan. 17, 1985, now abandoned.

BACKGROUND OF THE INVENTION

The invention relates to a process for treating liquid electrolytes in electrochemical cells which are non-partitioned or partitioned by at least one separator and have at least one gas diffusion electrode.

The process is preferentially suitable for Faraday reactions or secondary reactions within the electrochemical cell which form gas and consume gas. However, the process is also suitable for electrochemical reactions in which no gases are involved.

It is known, particularly in reactions which consume gas, to use the gas diffusion electrode as a vertical vessel wall for the electrolyte and to supply, or to remove, the necessary gas to, or from, respectively, the rear side of the electrode. In order to assist the production from the electrolyte of any gas bubbles which are formed, the electrolyte flows upwards through the cell. The pressure difference between gas and electrolyte should really be the same at every point of the gas diffusion electrode. However, as a result of the difference in density between the gas and the liquid, a hydrostatic pressure which decreases as the height increases is set up. At great heights of construction such as are customary in industrial plants, it can therefore happen that, in the upper section, gas passes through the gas diffusion electrode into the electrolyte, while in the lower section electrolyte enters the gas space. Both effects interfere with the progress of the reaction and the operation of the plant.

In reactions in which gas is evolved, it is not absolutely necessary to keep the rear side of the gas diffusion electrode free from electrolyte. The gas diffusion electrodes can, therefore, dip vertically into the electrolyte, as known, for example, from expanded metal electrodes. The gas diffusion electrode can also be firmly attached to a separator. Gas bubbles which rise within the electrolyte are then formed on at least one side of the gas diffusion electrode. This two-phase flow causes pressure fluctuations and vibration. In addition, the electrodes and separators are subjected to varying loads along the height of construction as a result of the static pressure of the electrolyte. Although some effects can be moderated by low heights of construction and by enlarging the rearward electrolyte space behind the gas diffusion electrode, these effects cannot be eliminated.

French Patent Application 2,514,376 discloses an electrolysis process in electrolytic cells partitioned by separators, in which the electrolyte is passed as a film over the surface of an electrode under the influence of gravity. Any gas formed can escape through the openings in the expanded metal electrode located above. It is not mentioned how the process is to be carried out for industrial electrolysis processes which evolve or consume gas.

SUMMARY OF THE INVENTION

The object of the invention, therefore, consists in substantially eliminating the hydrostatic and hydrodynamic effects.

A process of the type initially described is, therefore, suggested, in which a gas space is located laterally to the direction of flow of the electrolyte, which comprises allowing the electrolyte to flow by means of gravity in a thin layer through the electrochemical cell in such a way that the gas diffusion electrode is at least partially wetted.

In accordance with a further embodiment of the process, the electrolyte can flow between the gas diffusion electrode and a counter-electrode, it being possible for the counter-electrode to have a solid, perforated or microporous structure.

The electrolyte can also flow between the gas diffusion electrode and a separator or between the separators. The electrolyte can also flow between a counter-electrode having a perforated or solid structure and a separator. Several different electrolytes can be employed in partitioned electrochemical cells. The electrolyte can flow at least partially within the separator or the gas diffusion electrode for a low consumption of electrolyte.

The electrolyte can flow at least partially on the rear side of the gas diffusion electrode or only at the lateral regions of a strip-shaped gas diffusion electrode. It is also possible to wet the gas diffusion electrode on all sides. The gas diffusion electrode can also be wetted by means of a special capillary system which ensures that the electrolyte is transported between the gas diffusion electrode and the downward flowing electrolyte at another cell structure or at the capillary system.

The electrolyte can also flow in channels created by the geometrical shape of the gas diffusion electrode, of the separator or of the distance pieces. The channels can also be arranged so that the electrolyte is forced to flow in a meandering pattern.

By setting up a pressure difference between the spaces upstream and downstream of the gas diffusion electrode, it is also possible to induce the electrolyte to flow at least partially transversely through the gas diffusion electrode. Similarly, the electrolyte can also flow transversely through an arrangement comprising one to two gas diffusion electrodes and a separator constructed in the form of a diaphragm, if a difference in pressure is set up on the two sides of such an arrangement.

In accordance with a further embodiment, the electrolyte can also flow transversely through a stack of cells comprising several diaphragms and several gas diffusion electrodes, if a difference in pressure is set up in the spaces upstream and downstream of this stack of cells. The principle of the mode of operation of such a stack of cells, known as the ELOFLUX cell, originates, for example, from DECHEMA monographs, volume 92, 1885 ... 1913; pages 21 to 43, Verlag Chemie, Weinheim, N.Y., 1982. As a result of the application of the process according to the invention to the terminal gas diffusion electrodes, the electrolyte pressure in the pores is substantially independent of the height of construction, so that this type of cell too can be constructed in a very large form.

The pressure difference upstream and downstream of a gas diffusion electrode can also be modified hydrodynamically by changing the cross-section of flow of the electrolyte flowing upstream of the gas diffusion electrode one or more times. This modification can also be outside the gas diffusion electrode. It is thus possible to produce a pressure difference between the electrolyte and the gas even in cases where the electrolyte and the gas come into contact at the inlet and outlet. This modification can also be used to cause the electrolyte to flow in part transversely through a suitable gas diffusion electrode.

In a further embodiment of the invention, an electrode having a perforated structure can be used as the counter-electrode, and the electrolyte can be caused to flow downwards by means of gravity at the perforated electrode in such a way that a gas space is formed laterally to the direction of flow. This embodiment of the invention is particularly advantageous in the case of partitioned electrochemical cells. For example, in the electrolysis of alkali metal chlorides, an oxygen-consuming cathode and a chlorine-evolving perforated anode can be used together in a membrane cell. In spite of the development of bubbles in the anolyte, this cell is substantially free from static pressure phenomena, fluctuations in pressure and vibration.

In a further embodiment of the invention, it is possible to use a counter-electrode having a solid structure in a partitioned electrochemical cell and to arrange a gas space on the rear side of the counter-electrode and to cause the electrolyte to flow by means of gravity in a thin layer between the counter-electrode and the separator. In this way it is possible to avoid the influence of static pressure on the separator and the counter-electrode. Any desired pressure difference, independent of the height of construction, can be set up between this gas space and the electrolyte.

A separator is to be understood as meaning a sheet which separates the anolyte and the catholyte and/or the gases concerned from one another. It can be composed of a cation or anion exchange membrane or of porous material. The separator can also form one unit together with the gas diffusion electrode or a perforated electrode. As a result of its microporous structure, the gas diffusion electrode can assume the function of gas separation.

A gas diffusion electrode is to be understood as meaning an electrode having very small apertures or pores which offer a greater area of contact to the gas than the area corresponding to the projected macroscopic surface area. As is known per se, the gas diffusion electrode can be built up from several layers. These layers can also assume, wholly or partly, the function of a diaphragm. By a suitable choice of material, it is possible to influence the wetting property of the electrode surface. It is also possible to influence the depth of penetration of the electrolyte by suitable layer structure. A layer impervious to liquid can also be composed, for example, of finely porous PTFE sheeting which shuts off the rear side of the gas diffusion electrode. The depth of penetration of the electrolyte can, however, also be influenced by means of an appropriate pressure difference between the electrolyte space and the gas space.

With a view to simple technical construction, the electrodes and separators should be substantially vertical However, any angle of more than 0° and less than 180° to the horizontal is possible.

The electrodes and separators can be flat or curved, for example undulating or in the form of tubes. Arrangements composed of several electrodes and separators can have either bi-polar or mono-polar electrical interconnections.

If the electrolyte is to flow between two walls which can be regarded as hydraulically impervious, such as, for example, between the separators, the gas diffusion electrodes, a gas diffusion electrode and a separator or a solid electrode, care must be taken always to provide sufficient electrolyte so that gas bubbles are not sucked in, nor is an undesirable hydrostatic excess pressure formed. The pressure relationships will be illustrated by the example of an idealized case: the electrolyte should flow from a flat distribution channel which has pressure equalization on the gas side with the rearward gas space of a gas diffusion electrode, into the aperture between the gas diffusion electrode and the separator, and should flow out into the rearward gas space at the lower end of the electrode. It is also assumed that the properties of the materials, the volume of electrolyte and the width of the aperture do not alter with the height of construction. The resulting flow rate is then exactly that at which the potential energy of the electrolyte is dissipated by the frictional loss. The difference in pressure in relation to the rearward gas space is therefore constant and independent of the height of construction. Under the above assumptions, the pressure difference is virtually zero. In practice, of course, the volume of the electrolyte and the properties of the materials will alter. The effect on the pressure distribution can, however, generally be tolerated. It is also possible, however, to modify the flow cross-section for the electrolyte as a function of the height of construction for a particular design so that here too the potential energy of the electrolyte per unit of flow length is just dissipated by frictional losses.

The desirable invariance of the pressure difference with the height is thus achieved by imposing the same pressure at the inflow and outflow of the electrolyte. The electrolyte pressure can, of course, differ from the gas pressure in the rearward space downstream of the gas diffusion electrode. The measures necessary to ensure separate pressure chambers are known per se. The speed of the electrolyte in the aperture should be markedly less than 4 m/second, preferably not more than 1 m/second, so that the energy can be dissipated mainly by frictional losses and does not remain in the electrolyte as kinetic energy at the outflow. Typical aperture widths for low-viscosity electrolytes are between 0.1 and 1 mm. The aperture widths are larger in the case of meander-shaped deflections and if distance pieces having an increased resistance to flow are used. In general, the flow rate selected will be that which is desirable for the exchange of material or for the removal of heat. The speed of the electrolyte can be varied within very wide limits by means of the spacing of the aperture, the nature of the interposed distance pieces and the shape and nature of the electrodes and separators.

The process according to the invention is suitable for all electrochemical processes using liquid electrolytes which can be operated by means of gas diffusion electrodes. These can be processes which form gas or consume gas. Not only Faraday reactions are suitable, but also reactions in which gases take part in a secondary reaction. The process according to the invention can also be applied to processes in which no gases are involved. In these cases an inert gas is introduced. Instead of the customary electrodes having a solid structure, gas diffusion electrodes through which partial transverse flow can be arranged by the process according to the invention are then employed. This enables the large internal surface area to be utilized for reducing the overvoltage. In the case of reactions which are retarded by diffusion, the limiting current density is also increased.

In partitioned electrochemical cells, the suggested process can be applied to both halves of the cell or only to one. Both halves of the cell can be operated with gas diffusion electrodes, or an electrode having a perforated or solid structure can be used as a counter-electrode.

It is thus always possible to ensure that, even in the case of partitioned electrochemical cells, the unfavorable hydrostatic and hydrodynamic effects are eliminated. Vibrations and pressure fluctuations caused by the process do not occur. As a result of the early phase separation of electrolyte and gas in the electrode or in the near vicinity to the electrode, it is possible to make a great reduction, as a rule to a few millimeters, in the depth of the cell in electrolysis cells. Special apparatus for phase separation can often be dispensed with, since the phases have already been virtually separated on leaving the cells. The mechanical stress on electrodes, separators and other cell structures is extremely low when the process according to the invention is used. Electrodes and separators can therefore be thinner. This is an important contribution towards lowering the ohmic losses of potential and towards increasing operational safety. As a result of the disappearance of vibration and pressure fluctuations, chafing of electrodes and separators is also avoided. The sensitive layers on separators and electrodes are treated gently. Loosening of the structure of gas diffusion electrodes is also avoided. The electrodes and separators achieve a longer service life. The separation of the gas diffusion electrode from the counter-electrode or from the separator, is, as a rule, so small that one can virtually describe it as a zero separation. As a result of the suggested process, the gas diffusion electrode can be developed in an improved manner for its real task, since the finely porous barrier layer of gas which retards the mass transfer no longer needs to be designed for a wide range of pressures. A factor to be singled out is that the height of constuction of electrochemical cells is virtually no longer limited, which is particular importance for industrial use. The process according to the invention can also be employed in cases where the actual electrolyte between the anode and cathode is a solid, for example an ion exchange membrane (SPE process). The liquid electrolyte then only serves to supply or carry away the substances taking part, or is used for heat regulation.

The process according to the invention is also suitable for electrochemical cells having several separators between a pair of electrodes, such as, for example, cells for the electrodialysis of sea water.

In principle, the suggested process is suitable for all electrochemical processes for which it is possible to produce microporous electrodes having an adequate service life. The following may be mentioned as examples:
Electrolysis of alkali metal chlorides
Electrolysis of water
Fuel cells
Electrodialysis
Organic syntheses
Redox systems for the electrochemical production and storage of energy.

BRIEF DESCRIPTION OF THE DRAWINGS

The invention is described using FIGS. 1 to 31 as examples. Only those elements which are important for understanding are shown, and in a highly diagrammatic form. The figures are in all cases sections unless the contrary is expressly mentioned in the text. The casing, the inlet and outlet lines and the apparatus for distributing and collecting electrolyte have not been shown pictorially, since they are known per se to anyone skilled in the art. The distance pieces, which are also known per se, between electrodes and separators are only shown where particular importance attaches to their shape. For the sake of simplicity, all the arrangements shown have been drawn in a vertical position. The gas space formed laterally to the main direction of flow is immediatley adjacent to the electrodes or to the electrolyte which is flowing in a thin layer. A description in greater detail is only given in special cases. It will be clear to anyone skilled in the art whether an arrangement is suitable for gas-producing reactions or for gas-consuming reactions, and greater detail is only given in special cases.

DETAILED DESCRIPTION OF THE INVENTION

Figure 1:
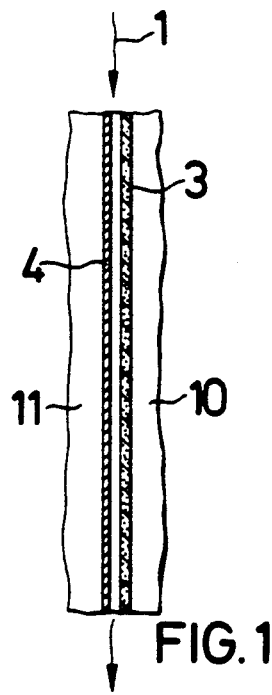

FIG. 1 shows a gas diffusion electrode 3 and an electrode 4 having a solid structure. The electrolyte 1 flows in the aperture between the electrodes 3 and 4. The gas spaces 10 and 11 are located on the rear side of the electrodes 3 and 4.

Figure 2:
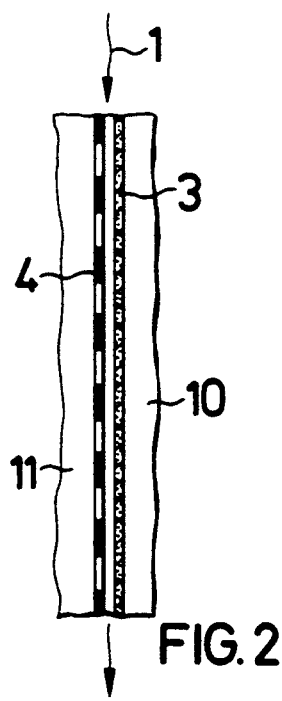

FIG. 2 shows a gas diffusion electrode 3 and a perforated electrode 4. The electrolyte 1 preferably flows in the aperture between the electrodes 3 and 4. The electrolyte 1 can wet the perforated electrode 4 wholly or partly, and this is also possible from the rear side. The openings in the perforated electrode 4 should be larger than the gas bubbles formed in the electrolyte, so that the openings do not become blocked by individual bubbles. Examples of suitable materials are perforated plates, expanded metals, woven wire cloth, electrodes composed of individual bars or strips of sheet metal and electrodes having recessed indentations in which the gas can be drawn off.

Figure 3:
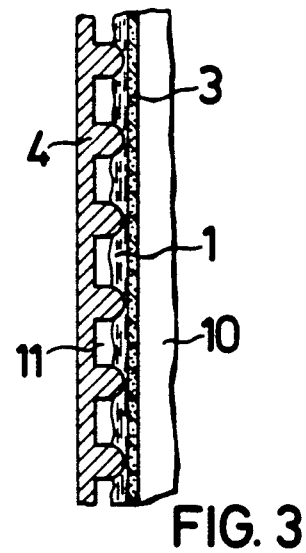

FIG. 3 shows a horizontal section containing a perforated electrode 4, which is shown here as an electrode having recessed indentations. This electrode 4 can at the same time assume the function of a bi-polar separator. The gas space 11 is, therefore, located within the electrode 4. If the gas diffusion electrode 3 carries an insulating layer on its front side, the two electrodes 3 and 4 can lie immediately one on top of the other. The insulating distance can, of course, also be fixed by means of distance pieces. The electrolyte 1 runs downwards in channels. The position of the electrolyte can be affected by the wetting properties of the perforated electrode 4 or by tilting it slightly. The gas space 10 belonging to the gas diffusion electrode 3 is immediately adjacent to the gas diffusion electrode 3.

Figure 4:
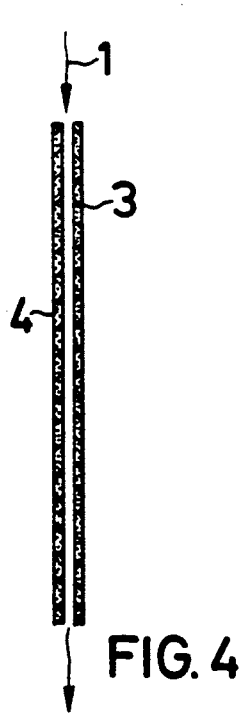

FIG. 4 shows two gas diffusion electrodes 3 and 4, which are located at a slight distance from one another. The electrolyte 1 flow through this aperture and wets both electrodes.

Figure 5:
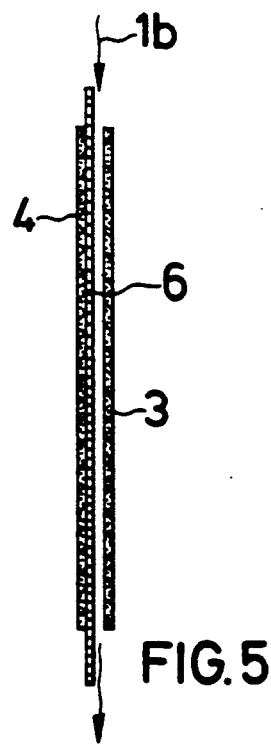

FIG. 5 shows an arrangement having a separator 6 and two gas diffusion electrodes 3 and 4. The electrolyte 1b flows in the aperture between the separator 6 and the gas diffusion electrode 3. The separator 6 can comprise a diaphragm. The electrode 4 is then wetted directly by the electrolyte 1b. The separator 6 can, however, comprise an ion exchange membrane. In the event that the ion exchange membrane transports ions which result in gaseous products, or if gaseous products are supplied to the electrode 4, the electrode 4 remains dry. Other products must, however, be brought up or removed by means of a further electrolyte, with at least partial wetting.

Figure 6:
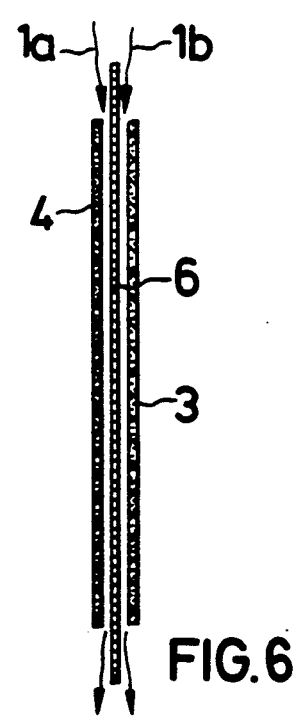

FIG. 6 shows an arrangement having a centrally located separator 6 and two gas diffusion electrodes 3 and 4 which are wetted by the two electrolytes 1a and 1b.

Figure 7:
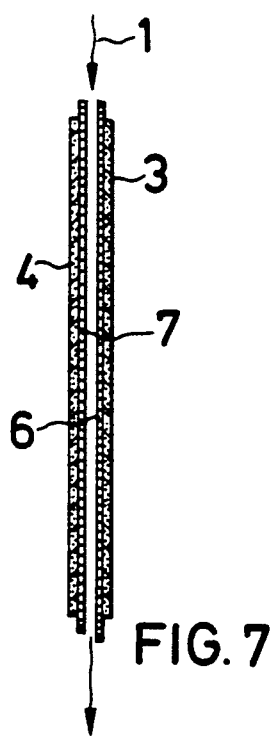

FIG. 7 shows an arrangement having two separators 6 and 7 and two gas diffusion electrodes 3 and 4. The electrolyte 1 flows between the separators. As already mentioned, however, the separators 6 and 7 can also be an integral constituent of the gas diffusion electrodes 3 and 4. This arrangement is suitable for fuel cells and for the electrolysis of water.

Figure 8:
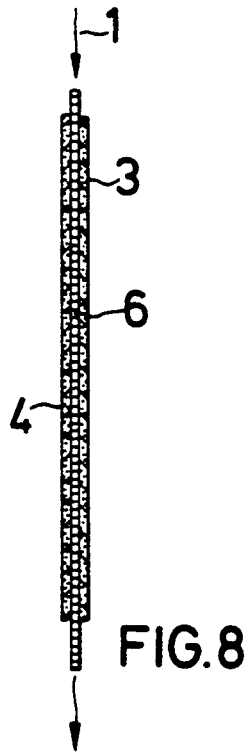

FIG. 8 shows an arrangement in which the electrolyte 1 flows within the separator 6. The separator 6 can have a homogeneous composition of a porous material or can be constructed in a heterogeneous manner from several layers having different structures. For example, this separator 6 can be conceived as having been formed from FIG. 7, if it is imagined that the separators 6 and 7 in that Figure, which are, if necessary, supported by distance pieces, are so close to one another that it is virtually possible to speak of one unit, particularly if a firm mechanical bond has been formed. The arrangement is preferentially suitable for a low throughput of electrolyte, for example in hydrogen/oxygen fuel cells operating with highly concentrated aqueous electrolytes or with melts as the electrolyte. The electrolyte 1 then flows only to maintain good conductivity through the separator 6. The water formed leaves the fuel cell chiefly in the form of gas.

Figure 9:
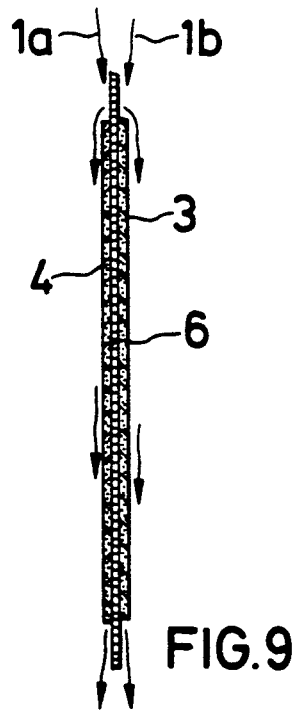
Figure 10:
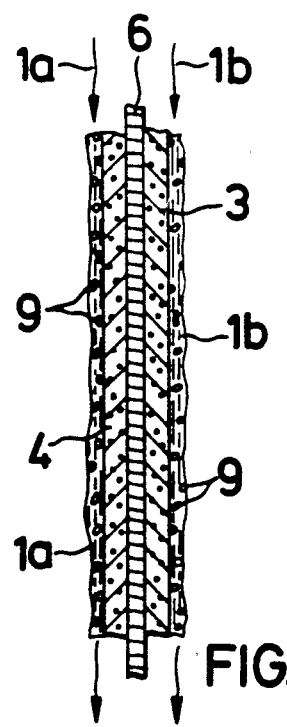

FIG. 9 and FIG. 10 show two gas diffusion electrodes 3 and 4 which rest immediately on the separator 6 or are connected mechanically. FIG. 10 is an enlarged section of FIG. 9. The electrolytes 1a and 1b should in this case completely cover, for example, the rear sides of the gas diffusion electrodes 3 and 4. A gas-producing reaction should therefore take place at both electrodes. In the electrolyte flowing down in a thin layer, the gas formed in the gas diffusion electrodes produces gas bubbles 9 which burst at the phase boundary to the gas space. A diaphragm can be used without problems as the separator 6 for the electrolysis of water. In the electrolysis of alkali metal chlorides, it is preferable to use a cation exchange membrane.

Figure 11:
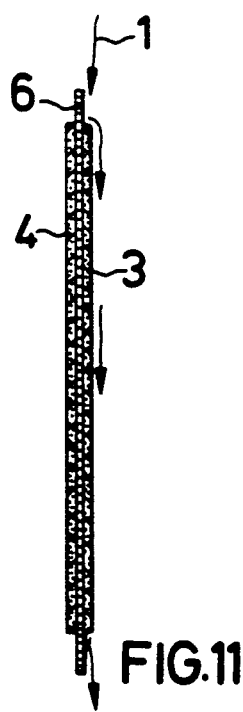

FIG. 11 shows an arrangement similar to that already illustrated and described in FIG. 9. FIG. 11 is, however, intended to illustrate operation in an electrolysis of water using a proton-conducting ion exchange membrane as the separator 6. Only one electrolyte 1 is required, because the hydrogen formed leaves the gas diffusion electrode 4 in the form of gas.

Figure 12:
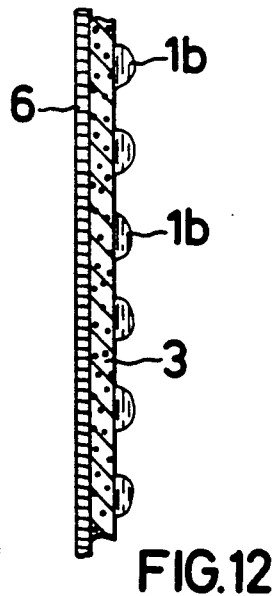

FIG. 12 shows a horizontal section having a separator 6 and a gas diffusion electrode 3. The counter-electrode is not shown. The rear side of the gas diffusion electrode 3 has strips which are located close beside one another and have a readily wettable surface and a less readily wettable surface. The electrolyte 1b then flows in strands preferentially on the readily wettable parts of the surface. The flow of electrolyte does not have to be uniform. For example, waves can be formed or the electrolyte 1b can flow down in droplets in contact with the surface, it being possible for parts of the less readily wettable surface to be covered transiently. Other patterns can also be provided instead of the hydrophobic and hydrophilic strips. Part of the surface should at least transiently be available for mass transfer in the form of gas. The electrolyte 1b can also be prevented from flowing over the whole of the surface by forcing it away by means of porous, hydrophobic strips arranged on the rear side of the gas diffusion electrode 3. These strips can be so thick that the electrolyte 1b flows, as it were, in channels. The gas diffusion electrode 3 should be constructed in a bi-porous form. The gas can then be transported, for example, in a continuous system of coarse pores, and the electrolyte 1b can be transported in a continuous system of fine pores. The arrangement shown can be employed in conjunction with a counter-electrode either for gas-consuming reactions or for gas-producing reactions.

Figure 13:
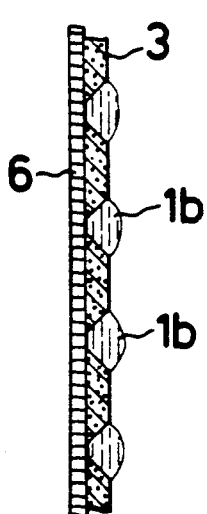

FIG. 13 shows a horizontal section. The mode of action and the construction are substantially the same as those of FIG. 12, but the runways for the electrolyte 1b are in this case cut into the gas diffusion electrode 3.

Figure 14:
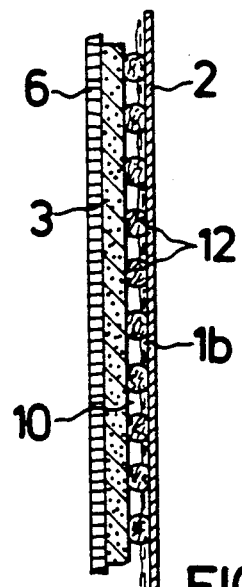

FIG. 14 shows a horizontal section having a gas diffusion electrode 3 and separator 6. The counter-electrode is not shown here. The electrolyte 1b flows down a wall 2 which can, for example, be a bi-polar separator. The gas diffusion electrode 3 is wetted via a capillary system 12 which can, for example, be made of a hydrophilic, porous or fibrous material. A slight inclination is helpful in ensuring that the electrolyte 1b remains in its illustrated position. The gas space 10 is located between the gas diffusion electrode 3 and the electrolyte 1b.

Figure 15:
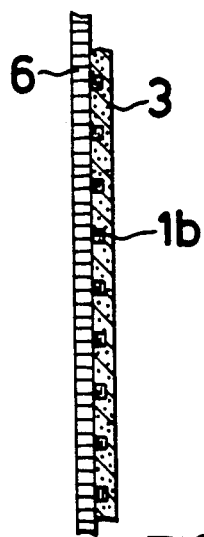

FIG. 15 shows a horizontal section without a counter-electrode. The electrolyte 1b runs in recessed channels in the gas diffusion electrode 3. In this case the channels are bounded by the separator 6. They can, however, also be completely recessed into the electrode.

Figure 16:
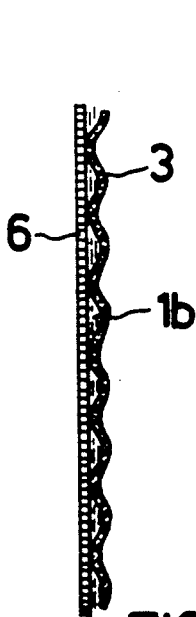

FIG. 16 shows a horizontal section without a counter-electrode. In this case the electrolyte 1b flows in channels which are formed by the undulating shape of the gas diffusion electrode 3. The channels are bounded by the separator 6. A small distance piece can be provided in order to improve the mass transfer in the interstices.

Figure 17:
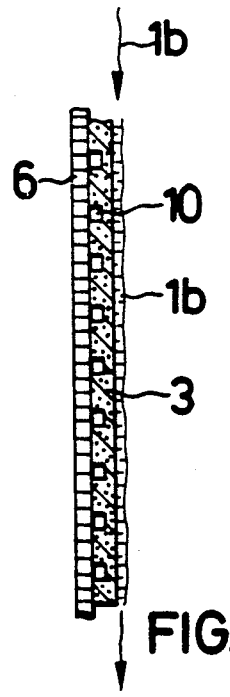

FIG. 17 shows an arrangement without a counter-electrode, having a gas space 10 which is located within the gas diffusion electrode 3 and which is in this case bounded by the separator 6. The electrolyte 1b flows on the rear side of the gas diffusion electrode 3. Arrangements having an internal gas space can be put together to form a very compact stack of cells. The electrolyte 1b can then flow in a thin layer between two electrodes.

Figure 18:
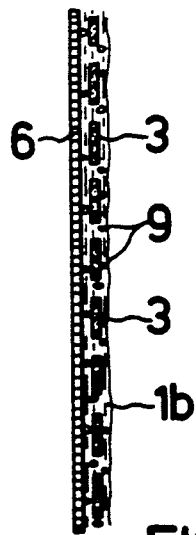

FIG. 18 shows a horizontal section without a counter-electrode, having a strip-shaped gas diffusion electrode 3 which is completely wetted by the electrolyte 1b. This arrangement is, of course, preferentially suitable for gas-producing reactions. The gas diffusion electrode 3 can release the gas 9 formed, preferably on the rear side, through a finely porous layer which does not take part in the reaction.

FIG. 19 shows an arrangement having a gas diffusion electrode 3 and a counter-electrode 4 which has a solid structure. The electrolyte 1a flows between the counter-electrode 4 and the separator 6. The electrolyte 1b flows between the gas diffusion electrode 3 and the separator 6. The gas space 10 is immediatley adjacent to the gas diffusion electrode 3. As already mentioned above, the components 3, 4 and 6 are not under the stress of the hydrostatic pressure of the two electrolytes—nor are they even if the electrolytes have different densities and the height of construction is very great. In order also to avoid hydrostatic loads coming from the rear side of the counter-electrode 4, a gas space 11 should also be located at the rear side of the electrode 4. This achieves a considerable saving of valuable materials and enables the design of the cells to be carried out in light-weight construction.

FIG. 20 shows an arrangement having a gas diffusion electrode 3, a separator 6 and a perforated electrode 4 as the counter-electrode. The electrolyte 1b flows between the separator 6 and the gas diffusion electrode 3. The electrolyte 1a flows partly on the rear side of the electrode 4 and partly between the electrode 4 and the separator 6. This arrangement is suitable for gas evolution at the perforated electrode 4. During operation an electrolyte film containing bubbles is formed. The gas bubbles reach the gas space 11, which is immediately adjacent, by a short path and release their gas content by bursting. At the current densities customary in industry, only a small proportion of gas will escape direct into this gas space 11 by diffusion at the phase boundary to the gas space 11.

FIG. 21 shows an arrangement having two gas diffusion electrodes 3 and 4 and a separator 6. A further separator 7 is located on the front side of the gas diffusion electrode 4. The separator 7 can, however, also be an integral constituent of the gas diffusion electrode 3. As is known per se, a finely porous layer of a material which does not take part in the reaction is to be preferred for this purpose. These materials can also be metals having an appropriately high overvoltage. The electrolyte 1a flows between the two separators 6 and 7. The electrolyte 1b flows between the separator 6 and the gas diffusion electrode 3. The gas spaces 10 and 11 are located on the rear sides of the gas diffusion electrodes 3 and 4. Either gas-producing or gas-consuming reactions can be carried out with this arrangement. It is also possible, for example, to carry out gas-consuming reactions at the gas diffusion electrode 3 and gas-producing reactions at the gas diffusion electrode 4.

FIG. 22 shows a diagram of a meander-shaped electrolyte flow. The meander-shaped formation of channels can be forced by means of distance pieces 5, but also by suitably shaping the electrodes or separators. In the event that the electrolyte 1 flows between hydraulically impervious walls, for example separators or gas diffusion electrodes, the channels should be completely filled with the electrolyte 1. Equalizing the pressure between individual channels and any gas spaces is not necessary, because here too, similar to the description given above for non-meander-shaped flow, the potential energy of the electrolyte 1 on its flowpath is always reduced as a result of fluid friction. If a small width is selected for the channels running transversely, it is possible to neglect the low static pressure differences between the upper region and the lower region of a channel. The flow rate, the dwell time and the distance between electrodes and separators can be varied within wide limits by suitable design of the channel cross-section.

FIG. 23 is intended to illustrate how the pressure difference between the electrolyte 1b and the gas space 10 can be influenced by hydrodynamic effects. As already explained, this pressure difference is independent of the height of construction, if the distance between the boundary walls of the downward-flowing electrolyte does not alter, and the flow properties and flow rate remain virtually constant. The boundary walls shown here are a gas diffusion electrode 3 and a separator 6. If, therefore, a restriction point is installed at the inflow of the electrolyte 1b, for example by means of a change in the cross-section of the distance piece 5, a subnormal pressure is formed immediately downstream of the restriction point. If the distance between the boundary walls 3 and 6 remains constant, the subnormal pressure will be reduced continuously until the electrolyte 1b emerges. It is assumed in this example that the electrolyte 1b is in direct contact with the gas space 10 at the inlet and outlet. If it is desired to maintain at a constant level, over the height, the subnormal pressure set up by restriction, the cross-section of flow in the lower region can be enlarged, for example by means of a fixed wall 14 adjoining the gas diffusion electrode 3. A subnormal pressure is formed because, as a result of the enlarged aperture, the potential energy of the electrolyte on its flow path is no longer completely removed in the form of fluid friction. The subnormal pressure caused by the restriction point and the enlargement in cross-section can be adjusted to the same value, thus giving a constant pressure difference in relation to the gas space 10 over the entire height of construction of the gas diffusion electrode 3. It is also possible to locate the restriction point below and the enlargement in cross-section above. An excess pressure, in relation to the gas space, which is independent of the height of construction is then set up. Cell design can be simplified by utilizing these effects. Even so, the most advantageous pressure difference can be selected for the gas diffusion electrode.

FIG. 24 shows an arrangement without a counter-electrode having a gas-producing gas diffusion electrode 3 and a separator 6. The electrolyte 1b flows through a continuously narrowing aperture. A hydrostatic excess pressure is formed as a result. This excess pressure can be used to cause the electrolyte to flow in part transversely through the gas diffusion electrode 3 and thus to ensure removal of the static pressure. The four short arrows are intended to indicate the flow through the gas diffusion electrode 3. This makes it possible to avoid concentration gradients within the gas diffusion electrode to a substantial extent. It is, therefore, possible to apply very high current densities. Since the constriction of the aperture between the gas diffusion electrode and the separator can be limited to fractions of a millimeter, the differential ohmic voltage drop can be neglected. Instead of the narrowing aperture it is also possible to employ distance pieces having a resistance to flow which increases in a downward direction. In gas-producing reactions the gas diffusion electrode 3 should be so designed that the gas emerges on the rear side. The gas bubbles 9 can then readily release their gas content to the adjacent gas space 10.

It is also possible to reverse the direction of flow of the electrolyte flowing transversely through the gas diffusion electrode, for example by means of an aperture which becomes wider.

Figure 28:
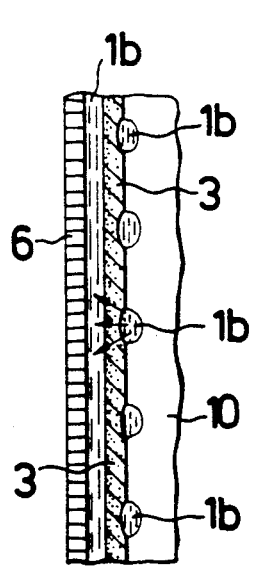

If care is taken that the reverse side of the gas diffusion electrode—as described in FIG. 12 or 28—is only partially wetted, this arrangement can also be employed for gas-consuming reactions.

It should also be noted that it is not only reactions involving a gas which can be carried out by means of this arrangement. A porous electrode through which there is transverse flow and which is close to a separator or electrode is of interest for many processes in which restriction of diffusion and high overvoltages must be expected. An inert gas can then be introduced into the gas space.

Figure 25:
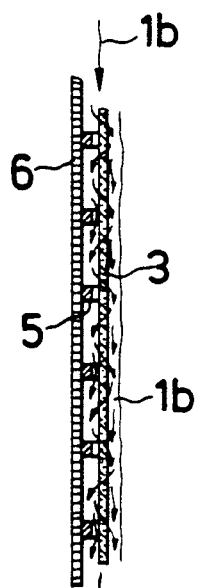

FIG. 25 shows an arrangement without a counter-electrode, in which the electrolyte 1b flows several times, with a change of direction, transversely through the gas diffusion electrode 3. FIG. 25 is a variant of FIG. 24. Instead of continuous restriction, several restriction points produced by special distance pieces 5 are installed. A counter-electrode can also be employed instead of the separator 6.

Figure 26:
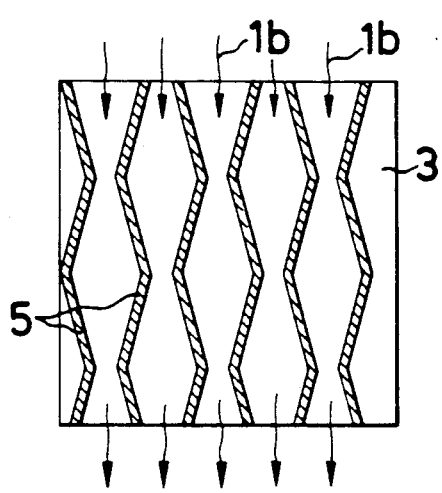

FIG. 26 shows a plan view of a special embodiment of the distance pieces 5. An effect similar to that of the transversely placed, strip-shaped distance pieces of FIG. 25 is achieved by this means. The restriction point is achieved in FIG. 26 by continuously narrowing the cross-section of flow. The pressure relationships do not change as abruptly as in FIG. 25. There is, therefore, a more uniform transverse flow through the gas diffusion electrode 3.

Figure 27:
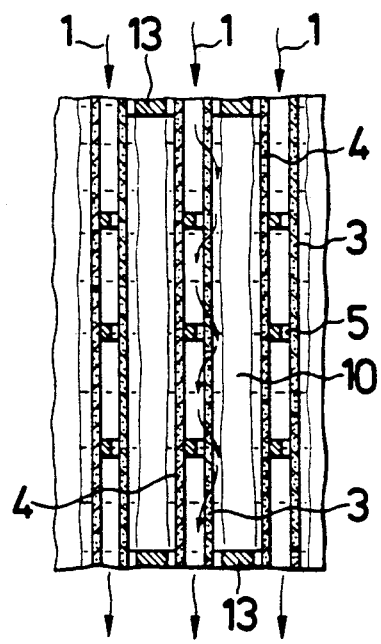

FIG. 27 shows an arrangement of several individual cells employing the flow principle of FIG. 25. A non-partitioned cell is illustrated. It is also possible, however, to provide separators between the two gas diffusion electrodes 3 and 4. The arrangement can have monopolar or bi-polar electrical connections. Component 13 is an electron-conducting contact bridge. The flow pattern of the electrolyte 1, for example at a gas diffusion electrode 3, is indicated by arrows. The electrodes 3 and 4 have a common gas space 10. The electrolyte 1 is several times restricted in its flow by distance pieces 5. When it has bi-polar connections, the arrangement is particularly suitable for reactions in which only one gas is formed or no gas at all takes part in the reaction. In the latter case an inert gas is introduced. The gas space constitutes a good insulator. It is therefore possible, even with bi-polar connections, to employ electrolytes of good conductivity without producing a short circuit on the electrolyte side, as in the so-called bi-polar particle electrodes. Very high current densities can be achieved by making use of the large internal surface areas of diffusion electrodes, coupled with short flow paths.

FIG. 28 shows a horizontal section without a counter-electrode, having a separator 6 and a gas diffusion electrode 3. The electrolyte 1b flows in the aperture between the separator 6 and the gas diffusion electrode 3 and, in part, in strands on the reverse side of the gas diffusion electrode 3. If the pressure in the gas space 10 is adjusted to a value higher than that in the aperture between the separator 6 and the electrode 3, it is possible—as indicated by means of arrows—for part of the electrolyte 1b to flow transversely through the biporous gas diffusion electrode 3 and thus to ensure equalization of differences in concentration. Since the reverse side of the gas diffusion electrode 3 is partly free from electrolyte, it is also possible to carry out gas-consuming reactions.

Figure 29:
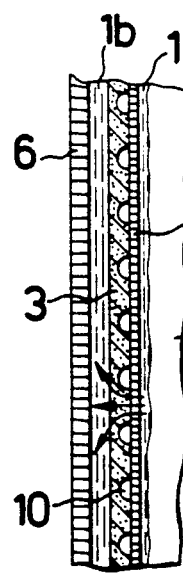

FIG. 29 shows a horizontal section without a counter-electrode, having a separator 6 and a gas diffusion electrode 3. Channels, in which a gas can be fed in or removed, are sunk into the gas diffusion electrode 3 to form a gas space 10. Part of the electrolyte 1b flows between the separator 6 and the gas diffusion electrode 3, and another part wets a capillary system 12, for example a diaphragm. It is possible to ensure, by means of a pronounced pressure difference between the two part streams, that the electrolyte flows—as indicated by means of arrows—in one direction or the other. The electrolyte 1b which wets the capillary system 12 can have lateral contact with a further gas space 8 or can flow between the capillary system 12 and another partition, not illustrated here. It can be advantageous to modify the cross-sections of flow in accordance with the details relating to FIGS. 24, 25 and 26.

Figure 30:
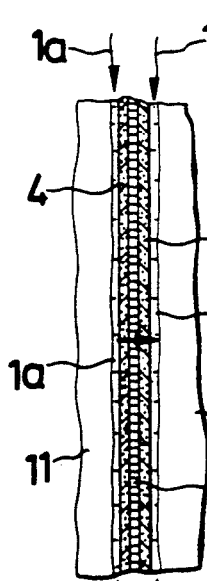

FIG. 30 shows an arrangement having two gas diffusion electrodes 3 and 4 and a separator 6. The electrolytes 1a and 1b flow on the reverse side of the gas diffusion electrodes 3 and 4 and cover the surface at least partially. If a pressure difference is set up between the gas spaces 10 and 11 and a diaphragm is used as the separator, the electrolyte 1a can—as indicated by means of the horizontal arrow—flow transversely through the gas diffusion electrodes 3 and 4 and the separator 6. Since, without transverse flow of electrolytes, concentration would take place on one side of the separator 6 and dilution would take place on the other side, for example in the alkaline electrolysis of water or in the hydrogen-oxygen fuel cell, the transversely flowing electrolyte 1a can result in an equalization of concentration. At the same time a concentration gradient within the gas diffusion electrodes is reduced thereby. Restriction of diffusion is, therefore, hardly to be expected. As a result of the large surface area which can now take an active part in the process, the overvoltage is low. Bubbles of gas formed are led by a very short path to the phase boundary at the gas spaces. In spite of high current loading, very compact cells can thus be constructed. The gas spaces 10 and 11 need to be only a few millimeters deep.

Figure 31:
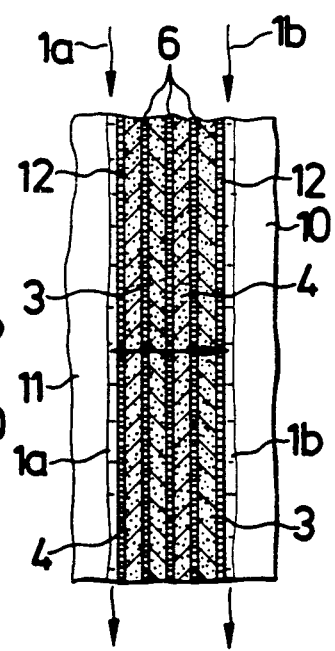

FIG. 31 shows the application of the suggestion according to the invention to a so-called ELOFLUX stack of cells. This makes it possible substantially to eliminate the hydrostatic pressure which also acts on the electrolyte-conveying pore system. A stack of this type comprises a plurality of gas diffusion electrodes 3 and 4 and separators 6 which are constructed as diaphragms. The reaction gases formed or required are transported within the gas diffusion electrodes 3 and 4 by means of the gas-conveying pore system. In order to assist the transport of gas, channels are, if necessary, sunk into the electrodes, for example in a manner similar to that in FIG. 29. The two terminal gas diffusion electrodes are covered by a capillary system 12, for example a diaphragm. If the electrodes are suitably constructed, the capillary system can also be omitted. The electrolytes 1a and 1b flow downwards as an open falling film with complete wetting of the two capillary systems 12.

If a pressure higher than that in the gas space 10 is set up in the gas space 11, part of the electrolyte 1a flows—as indicated by the horizontal arrow—transversely through the stack of cells. As already explained elsewhere, the electrolytes 1a and 1b can also flow in a narrow aperture between fixed walls, for example at electrodes, diaphragms or the cover plates of the stack of cells. The approximate equality of pressure between the inflow and outflow of the electrolytes 1a and 1b can be achieved easily in this case, for example by means of levelling vessels.

We claim:

1. A process for the manipulation of liquid electrolyte and gas during the operation of an electrochemical cell having at least one gas diffusion electrode and a counter electrode forming an electrolyte space for a flowing electrolyte which flows through the cell, from the upper end of the cell to its lower end, which electrolyte space is nonpartitioned or is partitioned by a separator, said gas diffusion electrode having a surface facing toward the electrolyte space and an opposite surface facing opposite from the electrolyte space, and said cell having a gas space located on said opposite surface, said process comprising:

feeding gas to or discharging gas from said gas space, feeding electrolyte to said electrolyte space and permitting said electrolyte to flow through said space from its upper end to its lower end by gravity only, the hydrostatic pressure between the upper end of the electrolyte space and the lower end of the electrolyte space being compensated for by decreasing the hydrodynamic pressure to provide a constant pressure at all locations along the length of the electrolyte space, from the lower end to the upper end.

2. The process as claimed in claim 1, wherein the electrolyte flows between the gas diffusion electrode and the counter-electrode.

3. The process as claimed in claim 1, wherein the electrolyte flows between the gas diffusion electrode and a separator.

4. The process as claimed in claim 1, wherein the electrolyte space is partitioned by two separators, and at least one electrolyte flows between two separators.

5. The process as claimed in claim 1, wherein at least one electrolyte flows between a said separator and an electrode having a solid structure.

6. The process as claimed in claim 1, wherein the electrolyte flows at least partially on the opposite side of the gas diffusion electrode.

7. The process as claimed in claim 1, wherein the electrolyte is caused to flow in such a manner that the gas diffusion electrode is at least partially enclosed by the electrolyte.

8. The process as claimed in claim 1, wherein the electrolyte flows in channels.

9. The process as claimed in claim 1, wherein the electrolyte flows at least partially in a meander pattern.

10. The process as claimed in claim 1, wherein the electrolyte flows downwards at a wall located behind the gas diffusion electrode, and the gas diffusion electrode is wetted via a capillary system.

11. The process as claimed in claim 1, wherein the electrochemical cell is one cell in a stack of cells, each cell comprising one gas diffusion electrode and at least one separator, and the electrolyte is caused to flow through the stack of cells.

12. The process as claimed in claim 1, wherein the counter-electrode is perforated and the electrolyte is caused to flow downwards by means of gravity at the performated electrode in such a manner that a gas space is formed laterally to the direction of flow of the electrolyte.

13. The process as claimed in claim 1, wherein the counter-electrode has a solid structure, and a gas space is located on the reverse side of the counter-electrode, and the electrode is caused to flow, by means of gravity, in a thin layer between the counter-electrode and the separator.

14. The process as claimed in claim 1, wherein the cross-section of flow of the electrolyte is varied at least once.

15. The process as claimed in claim 14, wherein the flow of electrolyte is restricted in cross-section at the upper end of the electrolyte space and is relatively larger at the lower end of the electrolyte space.

* * * * *